United States Patent [19]
Akiyama et al.

[11] Patent Number: 5,916,468
[45] Date of Patent: Jun. 29, 1999

[54] ELECTRICALLY WELDABLE PIPE JOINT AND PRODUCTION METHOD THEREOF

[75] Inventors: Saburo Akiyama, Mie-ken; Yoshio Katayama, Kumagaya; Nobuhiro Nishikata, Mie-ken, all of Japan

[73] Assignee: Hitachi Metals Ltd., Tokyo, Japan

[21] Appl. No.: 08/887,942

[22] Filed: Jul. 3, 1997

[30] Foreign Application Priority Data

Jul. 8, 1996 [JP] Japan ................................. 8-178355
Feb. 26, 1997 [JP] Japan ................................. 9-042376

[51] Int. Cl.⁶ .................................................... H05B 3/44
[52] U.S. Cl. ............................ 219/544; 219/535; 285/21
[58] Field of Search .................................... 219/525, 535, 219/538, 544, 546, 550, 643, 644; 285/21; 220/307; 29/611

[56] References Cited

U.S. PATENT DOCUMENTS

| | | | |
|---|---|---|---|
| 2,996,594 | 8/1961 | Tuttle ................................. | 219/544 |
| 3,062,940 | 11/1962 | Bauer et al. ........................... | 219/544 |
| 4,224,505 | 9/1980 | Sturm ................................. | 219/544 |
| 4,349,219 | 9/1982 | Sturm . | |
| 4,375,591 | 3/1983 | Sturm ................................. | 219/544 |
| 4,784,285 | 11/1988 | Patel ................................. | 220/307 |
| 4,825,534 | 5/1989 | White et al. ........................... | 29/611 |
| 4,975,563 | 12/1990 | Roebuck et al. ....................... | 219/544 |
| 5,086,213 | 2/1992 | Nussbaum et al. ..................... | 219/535 |
| 5,125,690 | 6/1992 | Taylor et al. .......................... | 285/21 |
| 5,163,713 | 11/1992 | Brettell et al. ......................... | 285/21 |
| 5,255,943 | 10/1993 | Keller et al. .......................... | 285/21 |
| 5,364,130 | 11/1994 | Thalmann ............................. | 285/21 |
| 5,375,889 | 12/1994 | Nakashiba et al. ..................... | 285/21 |
| 5,618,065 | 4/1997 | Akiyama ............................. | 285/21.2 |

FOREIGN PATENT DOCUMENTS

| | | |
|---|---|---|
| 0 535247 | 7/1997 | European Pat. Off. . |
| 2 664 531 | 1/1992 | France . |
| 9103254 | 8/1992 | Germany . |
| 9208024 | 10/1992 | Germany . |
| 2-30517 | 1/1990 | Japan . |
| 3-129195 | 3/1991 | Japan . |
| 6-27796 | 4/1994 | Japan . |
| 1393983 | 5/1988 | U.S.S.R. . |
| 1737216 | 5/1992 | U.S.S.R. . |
| WO91/02640 | 3/1991 | WIPO . |

*Primary Examiner*—Tu B. Hoang
*Attorney, Agent, or Firm*—Finnegan, Henderson, Farabow, Garrett & Dunner

[57] ABSTRACT

An inner-less electrically weldable pipe joint has a hollow cylindrical pipe joint body of a thermoplastic material and a resistance heating wire coil surrounded by the pipe joint body. The wire is partly exposed to an hollow interior of the pipe joint body and partly embedded in an inner surface of the pipe joint body. During the welding operation, the material of the welding zone of the pipe joint and the pipes being connected is readily and selectively heated by the heat from the exposed wire, there by enhancing the welding strength and shortening the welding time. Also, described are methods of producing such an inner-less electrically weldable pipe joint.

19 Claims, 7 Drawing Sheets

# ELECTRICALLY WELDABLE PIPE JOINT AND PRODUCTION METHOD THEREOF

BACKGROUND OF THE INVENTION

The present invention relates to an electrically weldable pipe joint for joining thermoplastic pipes such as polyethylene pipes and a production method thereof, and more specifically relates to an inner-less electrically weldable pipe joint injection-molded using a core having a resistance heating wire directly wound on the outer surface which defines the inner surface of the pipe joint.

Plastic pipes to be connected are inserted into the hollow interior of an electrically weldable pipe joint, and then electric power is supplied through the resistance heating wire embedded in the inner surface of the pipe joint. The plastic material of the outer surface of the pipes being connected and the inner surface of the pipe joint is partly melted by the generated resistance heat to tightly connect the pipe joint to the pipes.

Japanese Patent Publication No. 62-12437 discloses a production method of a pipe joint with an inner body on the inner peripheral surface thereof. In this method, a thin cylindrical plastic inner body with a grooved surface, which constitutes the inner surface of the pipe joint body, surrounds the outer surface of the core. After winding a resistance heating wire on the inner body along the bottoms of the groove, the core with a surrounding inner body is placed in a mold. Then, a molten resin is injected to a cavity between the mold inner surface and the outer surface of the inner body to injection-mold the electrically weldable pipe joint.

Since the resistance heating wire is received in the groove on the inner body outer surface, it has been expected that the resistance heating wire does not change its position during the injection molding to maintain the distance between each turn of the resistance heating wire constant.

However, this method requires an additional process for producing the inner body prior to injection-molding the pipe joint. In addition, since the inner body has a thin wall, the wall and the webs for defining the grooves are melted due to an injection pressure and a heat from the injected molten resin, and as a result, the wire frequently changes its position during the injection molding. In some cases, a turn of wire contacts with or overlaps another turn to cause an interturn short-circuit of the resistance heating wire to prevent sound welds of the pipes.

Japanese Patent Laid-Open No. 2-30517 discloses a production method of an inner-less electrically weldable pipe joint as shown in FIG. 16. In this method, a two-part solid core 5, 5 with a resin-coated resistance heating wire 3, each of both ends thereof is connected to each terminal pin 4, 4, wound directly on the outer surface thereof, which defines the inner surface of the pipe joint body, is placed in a mold 7. The pipe joint body is injection-molded by injecting a molten resin into a cavity between the mold 7 and the core 5. After the molding is completed, the molded pipe joint is removed from the mold 7, and the cores 5, 5 are axially withdrawn form the molded pipe joint in the opposite directions to obtain an electrically weldable pipe joint having the resin-coated wire 3 embedded in the inner surface thereof.

In the known method of producing the inner-less electrically weldable pipe joint mentioned above, the resin-coated wire 3 wound on the outer surface of the core 5 changes its position due to the injection pressure and the heat from the injected molten resin to produce an electrically weldable pipe joint having a wire embedded in the inner surface thereof with uneven spacing between each tun of the wire 3 and/or a wire out of the intended positions. Therefore, during the welding operation, an interturn short-circuit occurs between the closely positioned turns of the wire 3 or between the contacting turns of wire 3 to prevent sound weld of the pipes.

Therefore, the resistance heating wire 3 used in the above method should be coated with a thermoplastic insulating resin to avoid the short-circuit. However, the short-circuit cannot be avoided completely even when such a resin-coated wire is used because the resin coating is melted due to the injection pressure and the heat from the injected molted resin. In addition, since the resin coating is difficult to have a constant thickness over the full length of the wire, the distance between the resistance heating wire and the inner surface of the pipe joint is variable to result in an uneven heating.

In the known electrically weldable pipe joint with or without the inner body, the resistance heating wire is completely embedded in the inner surface thereof. Therefore, during the welding operation, the resin of the pipe joint body in the immediate vicinity of the wire is first heated, and then the heat from the resistance heating wire is conducted to the pipes being connected to melt the resin of the outer surface of the pipes. This delayed heating requires an excess of electric power and an prolonged period of time for completing the welds. Therefore, the pipe joint body is heated excessively before the outer surface of the pipes being connected is melted to deteriorate the resin in the vicinity of the resistance heating wire or deform the pipe joint body.

OBJECT AND SUMMARY OF THE INVENTION

Accordingly, an object of the present invention is to provide an inner-less electrically weldable pipe joint having a resistance heating wire coil with a constant inter-turn spacing avoiding an electrical short-circuit, having a good conducting efficiency of the heat generated by the resistance heating wire, and requiring a short welding time for connecting the pipes.

Another object of the present invention is to provide a method of producing such an electrically weldable pipe joint, which avoids the change of the positions of the resistance heating wire during the injection molding of the electrically weldable pipe joint even when the wire is directly wound on a core.

As a result of the intense research in view of the above objects, the inventors have found that the welding time can be reduced with sound welds of the pipes by circumferentially laying the resistance heating wire on the inner surface of the pipe joint body in such a manner that a part of the wire is completely or substantially embedded in the inner surface and another part of the wire is partly or completely exposed to the hollow interior of the pipe joint body. The inventors have further found that the position change of the resistance heating wire during the injection molding of the electrically weldable pipe joint can be avoided by using a core circumferentially equipped with a plurality of movable members with a grooved outer surface, which groove receives the resistance heating wire on the bottoms thereof. The present invention has been accomplished by these findings.

Thus, in a first aspect of the present invention, there is provided an electrically weldable pipe joint comprising a hollow cylindrical pipe joint body of a thermoplastic material and a resistance heating wire coil surrounded by the pipe joint body, wherein the wire is partly exposed to an hollow interior of said pipe joint body and partly embedded in an inner surface of the pipe joint body.

In a second aspect of the present invention, there is provided a method of producing the electrically weldable pipe joint as described above, which method is specified by using a movable member with grooved surface which receives and maintains a resistance heating wire in positions during the injection molding and is removed from the molded pipe joint after the injection molding is completed.

BRIEF DESCRIPTION OF THE DRAWINGS

In the following drawings, like reference numerals indicate like parts.

DETAILED DESCRIPTION OF THE INVENTION

Figure 8:
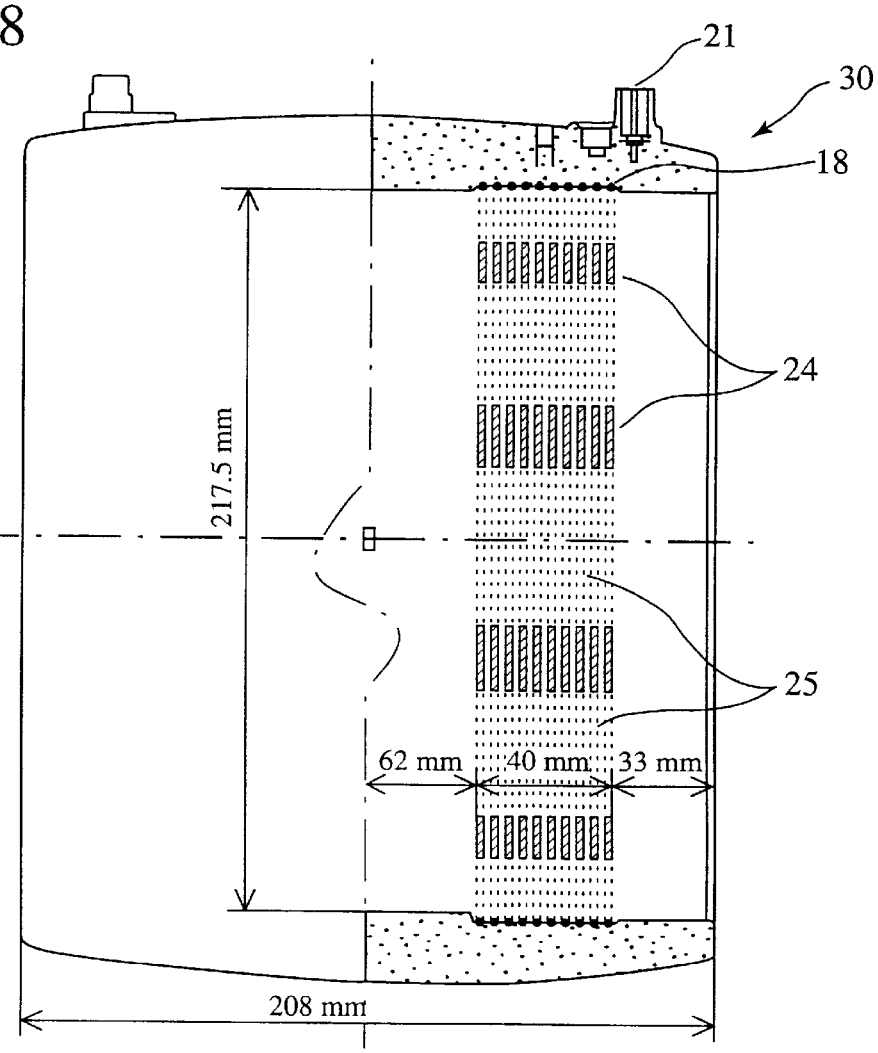
FIG. 8 is a partially sectional view showing the inner surface of an electrically weldable pipe joint of the present invention.

FIG. 8 is a partially sectional view showing the inner surface of the electrically weldable pipe joint 30 of the present invention. As seen from FIG. 8, the resistance heating wire 18 circumferentially laid on the inner surface of the electrically weldable pipe joint 30 is partly embedded in the inner surface (embedded portion 25), and partly exposed to the inner interior (exposed portion 24). The embedded portion 25 and the exposed portion 24 are preferred to occur alternately along the circumferential inner surface of the electrically weldable pipe joint 30. The length of each of the exposed portion 24 and the embedded portion 25 is preferably up to 60 mm, more preferably 20 to 40 mm along the circumferential inner surface.

Figure 9:
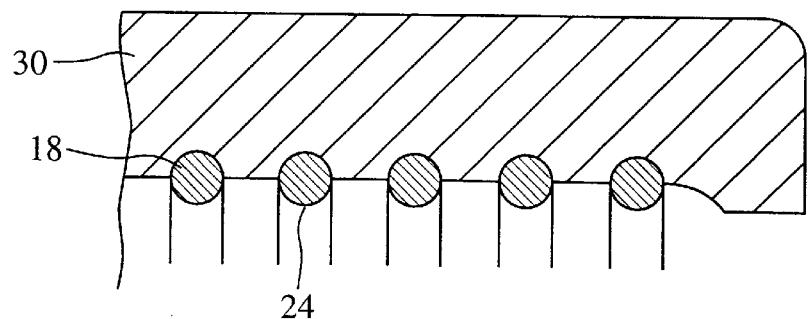
FIGS. 9 and 10 are sectional views showing the resistance heating wire partly exposed to the hollow interior of the electrically weldable pipe joint of the present invention.
Figure 10:
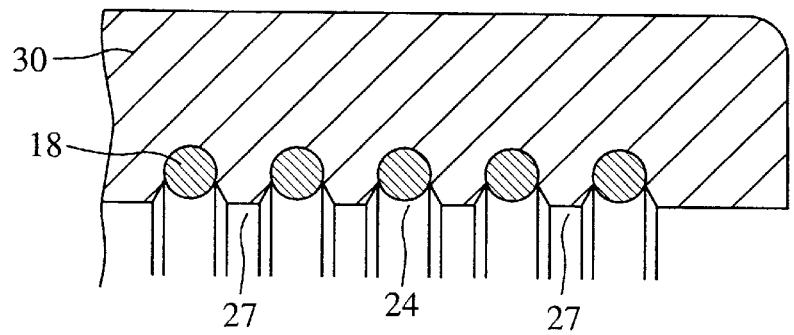
Figure 11:
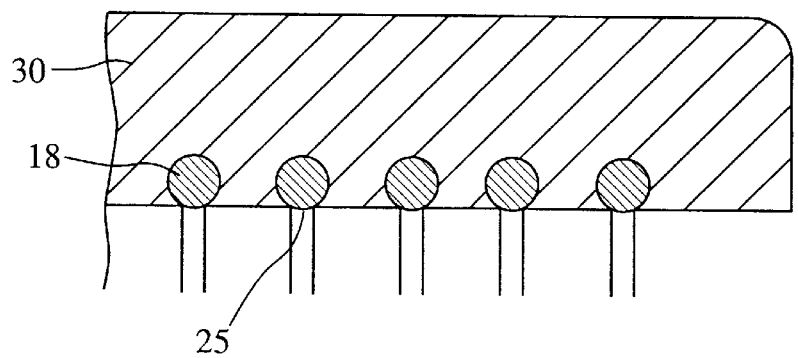
FIGS. 11 and 12 are sectional views showing the resistance heating wire substantially and completely embedded in the inner surface of the electrically weldable pipe joint body of the present invention.
Figure 12:
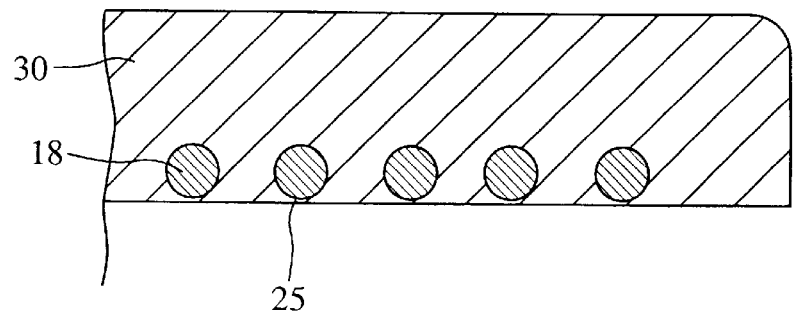

The "exposed portion" referred to in the present invention is a portion in which the resistance heating wire is partly exposed, preferably 15 to 50%, more preferably 25 to 30% of the sectional circumferential length of the wire is exposed to the hollow interior within the electrically weldable pipe joint as shown in FIGS. 9 and 10. The "embedded portion" referred to in the present invention is a portion in which the exposed portion of the resistance heating wire is less than the above range as shown in FIGS. 11 and 12.

Figure 1:
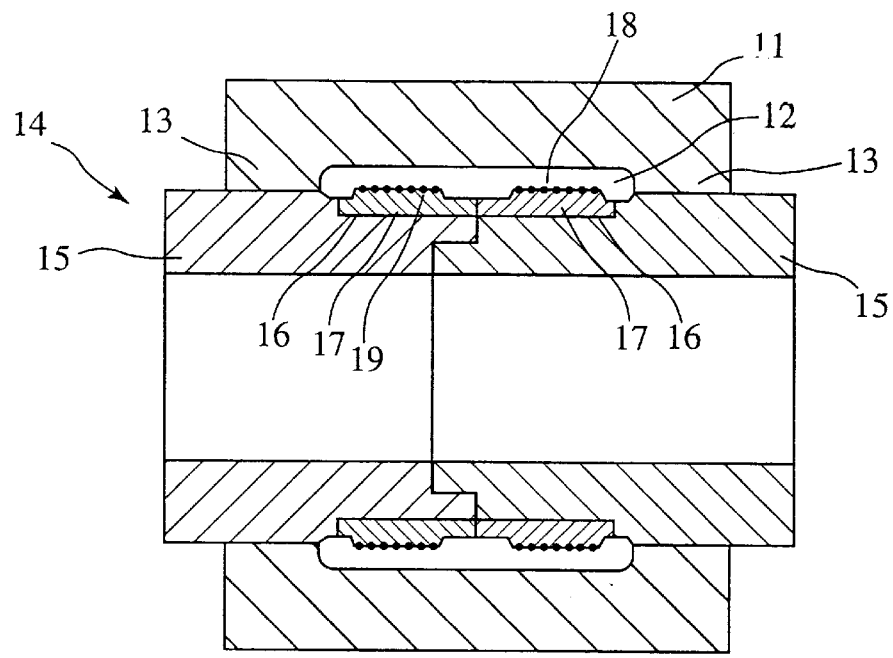
FIG. 1 is a cross sectional view illustrating a method of producing the electrically weldable pipe joint of the present invention.
Figure 2:
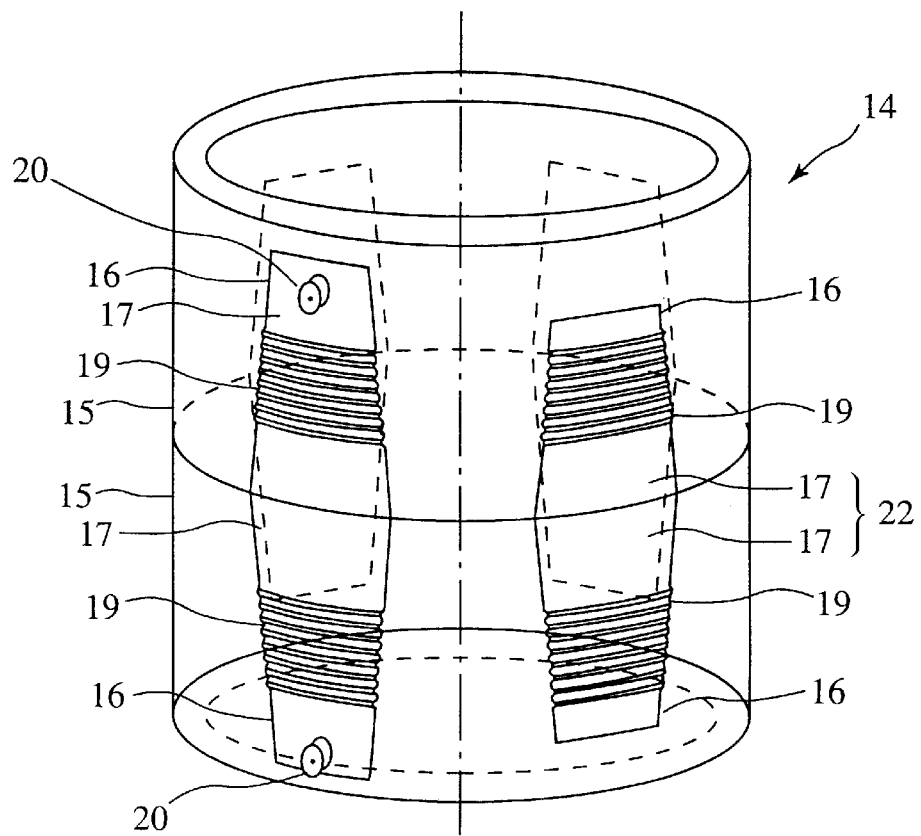
FIG. 2 is a perspective view showing a core equipped with a movable member.

FIG. 1 is a cross sectional view illustrating a method of producing the electrically weldable pipe joint of the present invention, and FIG. 2 is a perspective view showing a core equipped with a movable member.

In FIG. 1, a two-part core 14 consisting of cylindrical core parts 15, 15 each of which has at its end portion a plurality of slide grooves 16 which are circumferentially arranged along the outer surface of the core part 15. The slide groove 16 receives a movable member 17 with a grooved outer surface slidably and movably in the axial direction of the core 14. The core parts 15, 15 are fitted to each other by tongue-and-groove joint to constitute the core assembly 14 so that a movable member 17 on one of the core part 15, 15 and another movable member 17 on the other core part 15 constitute a movable member assembly 22. The core assembly 14 having a plurality of the movable member assemblies 22 is placed in a mold 11 and supported by support portions 13, 13 at the axial end of the mold 11. A cavity into which a molten resin is injected is defined between the inner surface of the mold 11 and the outer surface of the core 14 having the movable members 17. A resistance heating wire 18 is spirally wound partly on the outer surface of the core part 15, and partly on the movable member 17 along the bottoms of grooves 19 which extend over welding zones. One of the movable member assemblies 22 on the core 14 has at both the end portions thereof terminal supports 20 to which each of free ends of the resistance heating wire 18 is connected. The terminal support 20 receives a terminal pin (shown in FIGS. 5 and 8) through which a heating current is supplied to the resistance heating wire 18 when the welding is carried out.

Figure 3:
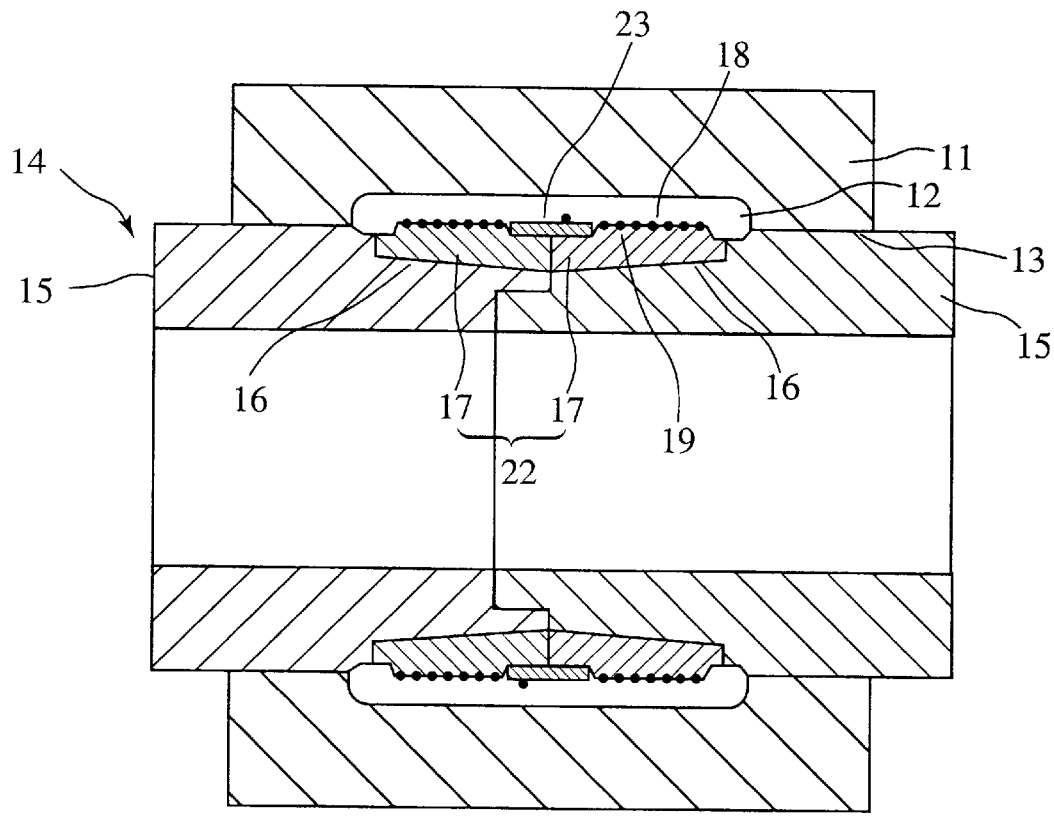
FIG. 3 is a cross sectional view illustrating another method of producing the electrically weldable pipe joint of the present invention.
Figure 4:
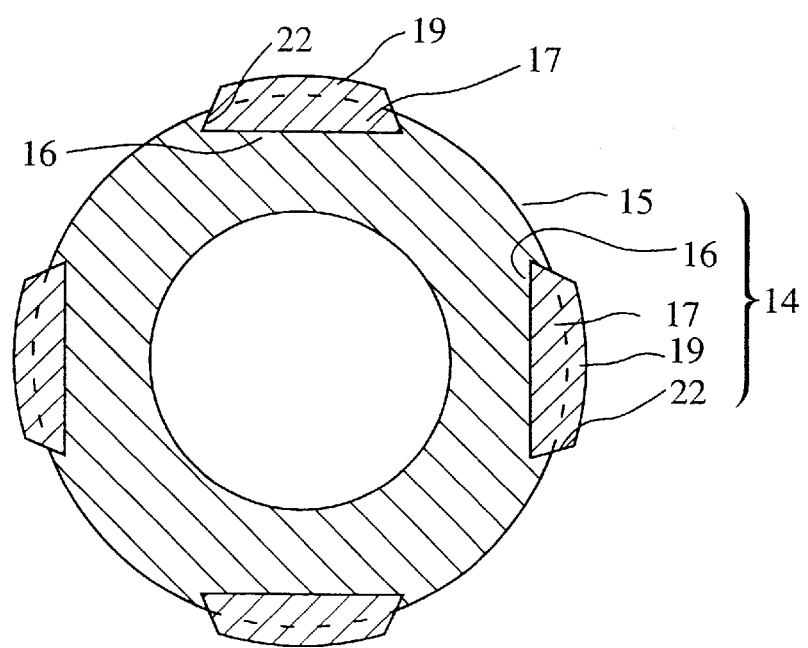
FIG. 4 is a cross sectional view of a core having the movable members fitted in dovetail grooves on the core.

In the embodiment of FIG. 1, the depth of the slide groove 16 remains constant. Alternatively, the depth may be gradually increased towards the axial center of the electrically weldable pipe joint as shown in FIG. 3. Further, the slide groove 16 may be a dovetail groove as shown in FIG. 4 which allows the movable member 17 to axially move relatively to the core parts 15, but prevents the movable member 17 from radially moving. With this tapering configuration of the depth toward the axial center of the pipe joint and the dovetail groove, the movable member 17 moves inwardly in the radial direction in association with the outward movement of the core parts 15, 15 in the opposite axial directions to enable the core parts 15, 15 and the movable members 17 to be simultaneously separated from the injection-molded pipe joint body.

The movable member 17 has the grooved outer surface, in which a plurality of circumferential grooves 19 are formed over the welding zone along the axial direction. The material for the movable member 17 is not specifically limited and may be the same as that of the core part 15 as far as it is not melted during the injection molding and it is easily removed from both the core part 15 and the inner surface of the pipe joint after the completion of the injection molding.

The two movable members 17 with a grooved outer surface is made into the movable member assembly 22 in the embodiment of FIG. 1. However, the movable member 17 may be made of a single body as far as it is movable relatively to each core part 15 along the slide groove 16.

Prior to the injection molding, the resistance heating wire 18 is spirally wound along the bottoms of the grooves 19 of the movable member 17 fitted to the slide groove 16 of the core 14 from one axially outer end of the groove 19 on one movable member 17 to the axially outer end of the groove 19 on the other movable member 17 through the intermediate portion between the grooves 19 of both the movable members 17. The ends of the wire 18 are connected to the terminal supports 20, 20.

As shown in FIG. 1, it is preferred that the bottoms of the grooves 19 define a surface nearly equal to the free outer surface of the core part 15. Such a configuration minimizes the difference in the level at the transition portion between the bottoms of the grooves and the free outer surface of the core part 15. The depth of the grooves 19 is usually about a half of the outer diameter of the resistance heating wire 18. The depth may be reduced up to about ¼ of the outer diameter of the resistance heating wire 18 when the wire 18 is thick or the wire 18 is tightly wound.

As shown in FIG. 3, a resin sleeve 23 may be disposed to cover the intermediate portion between the welding zones of the movable member assembly 22. The resistance heating wire 18 from one of the welding zones is led to the other welding zone by passing over the resin sleeve 23. Since the resin sleeve 23 comes integral with the pipe joint body during the injection molding, the wire laid on the resin sleeve 23 is embedded deeply from the inner surface of the pipe joint to prevent the excessive heating of the axially central portion of the pipe joint adjacent to the ends of the pipes being connected. In addition, the penetration of the fluid flowing the connected pipes from the exposed portion of the wire into the pipe joint body can be effectively prevented because no exposed wire is present in the connected pipes.

Figure 5:
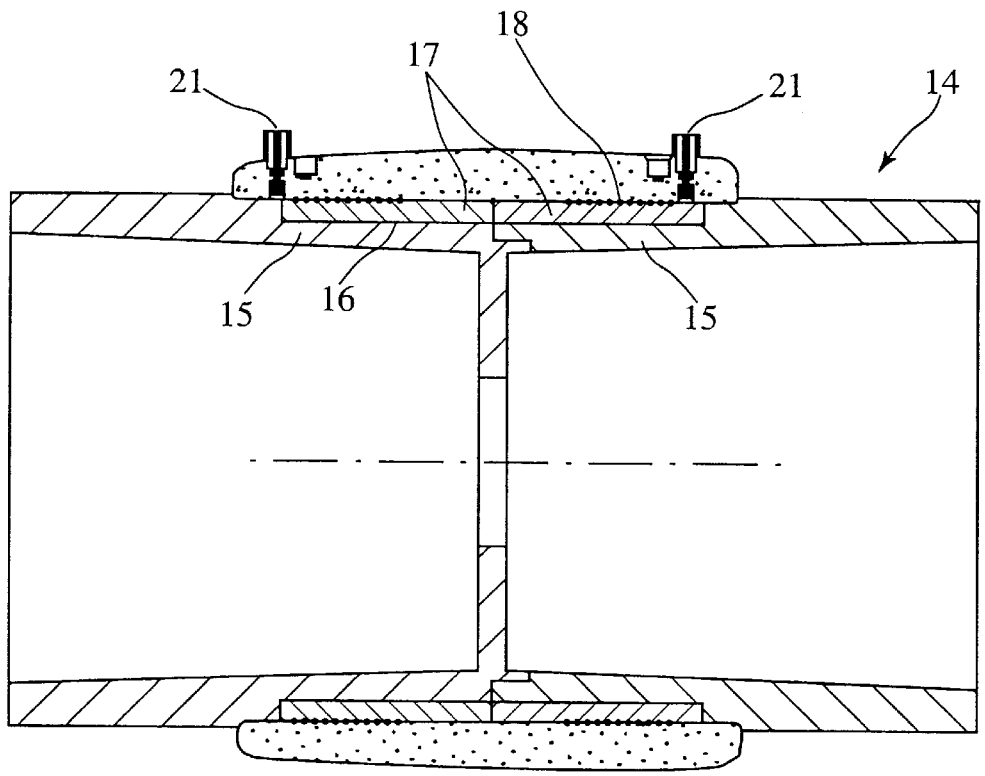
FIG. 5 is a cross sectional view showing a molded electrically weldable pipe joint of the present invention released from a mold together with the core and the movable member.
Figure 6:
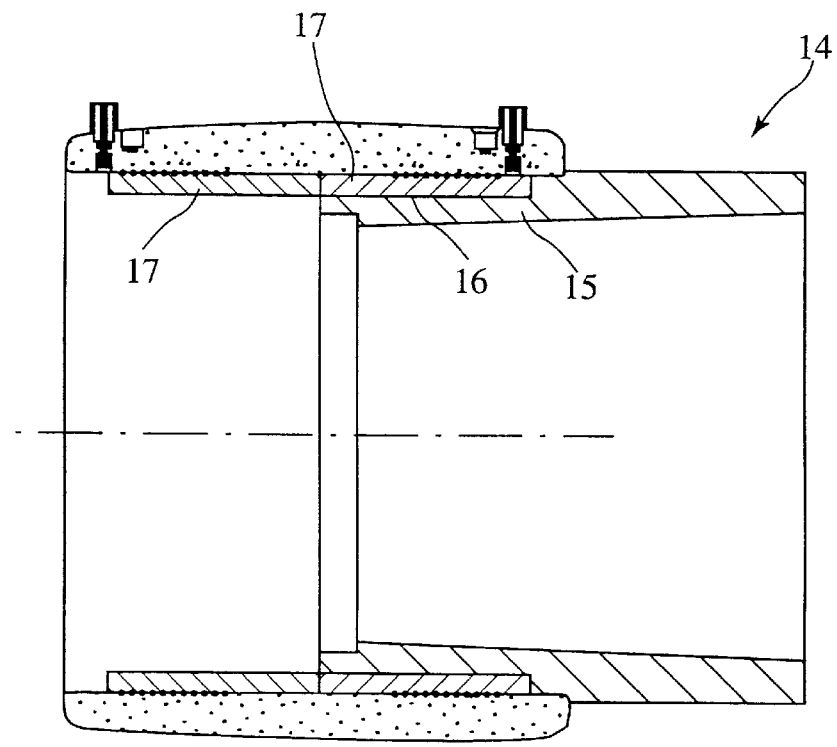
FIG. 6 is a cross sectional view showing a molded electrically weldable pipe joint shown in FIG. 5 after removing one of the core.
Figure 7:
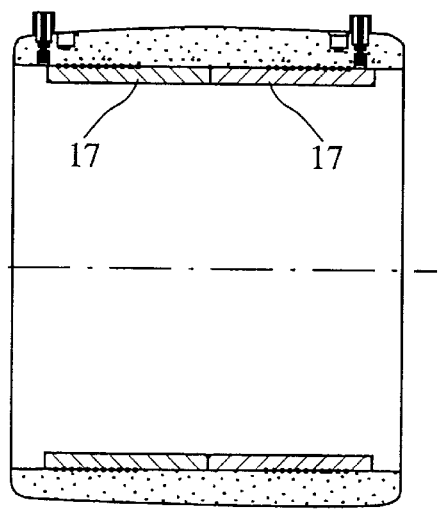
FIG. 7 is a cross sectional view showing a molded electrically weldable pipe joint shown in FIG. 5 after removing both the core.

The core 14 fitted with the movable members 17 is placed in the mold 11, and a molten resin is injected into the cavity 12 from an injection molding machine. The resin is not specifically limited as far as it is thermoplastic. After the injection molding is completed, the molded product is released from the mold 11 usually together with the core 14 and the movable members 17 as shown in FIG. 5. Then, the core parts 15, 15 are removed from the molded product, for example, as shown in FIGS. 6 and 7. Since the core parts 15 has a smooth outer surface and is axially movable relatively to the movable member 17, one of the core parts 15, 15 is removed from the molded product by withdrawing the core part 15 outwardly in the axial direction while leaving the movable members 17 on the inner surface of the molded product as shown in FIG. 6 because the partially embedded wire 18 which is also partly received in the grooves 19 prevent the movable member 17 from moving in the axial direction. The other remaining core part 15 is removed in the same manner as above to provide the molded product having the movable members 17 as shown in FIG. 7. The movable members 17 left on the inner surface of the molded product are removed by inwardly moving them in a suitable manner to obtain the electrically weldable pipe joint 30 of the present invention as shown in FIG. 8. The withdrawal of the core parts 15, 15 may be carried out simultaneously by withdrawing the core parts 15, 15 outwardly in the opposite directions. If the slide groove 16 is a dovetail groove having a tapering configuration as shown in FIGS. 3 and 4, the movable members 17 and the core parts 15, 15 are simultaneously removed from the molded product by simultaneously withdrawing the core parts 15, 15 outwardly in the opposite directions. The removal of the core parts 15, 15 may be carried out before the molded article is released from the mold 11.

As shown in FIG. 8, the resistance heating wire 18 has the exposed portion 24 in which the wire is partly exposed to the hollow interior of the electrically weldable pipe joint 30 and the embedded portion 25 in which the wire is completely or substantially embedded in the inner surface of the electrically weldable pipe joint 30. Both the portions alternately occur along the circumferential direction.

FIGS. 9 and 10 cross-sectionally show the exposed portion 24. The portion of the resistance heating wire 18 received in the groove 19 of the movable member 17 partially exposes its surface to the hollow interior because the groove 19 prevents the wire 18 from being coated with the molten resin while the rest of the surface is embedded in the inner surface of the molded pipe joint. In the embodiments of FIGS. 9 and 10, a half of the wire 18 is exposed to the hollow interior and the other half of the wire 18 is embedded in the inner surface. Namely, the exposure height, which corresponds to the depth of the groove 19, is a half of the outer diameter of the wire 18.

Figure 13:
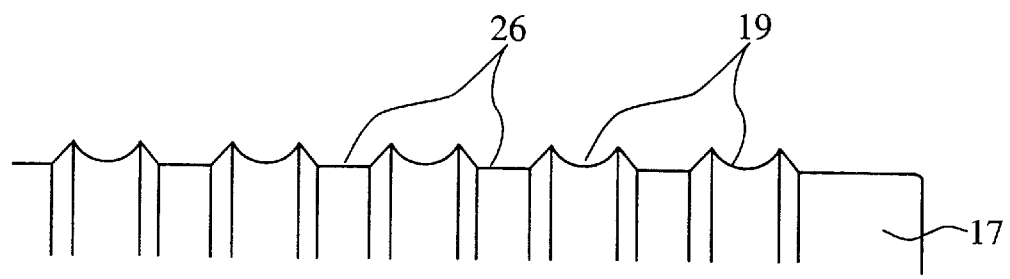
FIG. 13 is a schematic cross-sectional view showing a configuration of a grooved outer surface of a movable member.

If the grooved outer surface of the movable member 17 has a configuration as shown in FIG. 13 in which the portion between the adjacent grooves has a recess 26 of nearly the same depth as that of the groove, the exposed portion 24 shown in FIG. 10 in which the exposure height is nearly the same as the height of a web 27 is obtained. Since the webs 27, corresponding to the recesses 26, of the same height as the exposure height of the wire 18 formed between the turns of the exposed wires 18 reduces the hollow space in the vicinity of the exposed wires 18 and the hollow space between the wire 18 and the outer surface of the pipes being connected. Therefore, the heat generated by the wire 18 is easily and effectively conducted to the material of the inner surface of the pipe joint body. Also, the reduced hollow space prevents the dust, dirt, etc. from adhering to the inner surface exposed to the space, and makes the removal of the contaminants from the inner surface prior to the welding operation easy.

FIGS. 11 and 12 cross-sectionally show the embedded portion 25. The wire 18 wound of the smooth free surface of the core part 15 is completely or substantially embedded in the inner surface. When the wire 18 is tightly wound against the outer surface of the core part 15, the wire 18 is substantially embedded in the inner surface as shown in FIG. 11 because no space is present, into which the injected molten resin enters, between the wire 18 and the outer surface of the core part 15. When the bottoms of the grooves 19 are positioned higher than the outer surface of the core part 15, the wire 18 is wound slightly apart from the outer surface of the core part 15 at the portion between the movable members 17. The injected molten resin comes into the gap between the outer surface the wire 18 to produce the completely embedded portion 25 as shown in FIG. 12.

Since the groove 19 on the outer surface of the movable member 17 effectively prevent the resistance heating wire 18 form changing its position during the injection molding, a bare wire, in addition to a resin-coated wire conventionally used, is usable in producing the electrically weldable pipe joint by the method of the present invention. Also, since the wire 18 not only in the embedded portion 25 but also in the exposed portion 24 is fixed in positions by the resin constituting the pipe joint body, the wire 18 does not change its position during the insertion of the pipes to be connected into the hollow interior of the electrically weldable pipe joint and the subsequent welding operation, thereby avoiding the interturn short-circuit. In addition, the wire 18 in the exposed portion 24 and even in the embedded portion 24 is located in the immediate vicinity of the outer surface of the pipes being connected as compared with the pipe joints known in the art. Therefore, the heat generated by the resistance heating wire 18 is immediately and effectively conducted to the outer surface of the pipes in the welding zone, thereby ensuring a satisfactory connection of the pipes with a high welding strength in a short welding time and avoiding the unfavorable heating of the portions other than the welding zone to prevent the deformation and deterioration of the pipe joint.

The effect of the present invention will be described while referring to the following Example which should be considered to illustrate various preferred embodiments of the present invention.

EXAMPLE

An electrically weldable pipe joint 30 having the size shown in FIG. 8 was produced by injection molding using a medium-density polyethylene of 220° C. under a core temperature and a mold temperature each being 40° C. In the same manner as shown in FIG. 4, ten pieces of movable members 17 which have a width of about 35 mm were fitted to slide grooves 16 of a core part 15 at equal circumferential spaces. Two of such core parts 15 were abutted against each other to form a core assembly 14 so that the movable members 17 were aligned to form respective movable member assemblies 22. Then, after winding a bare resistance heating wire 18 on the core assembly 14 along the groove 19, the core assembly 14 was placed in a mold 11 and a molten medium-density polyethylene of 220° C. was injected to the cavity, thereby obtaining the pipe joint of the present invention. The circumferential length was about 35 mm for each of the exposed portion and the embedded portion.

COMPARATIVE EXAMPLE

Figure 16:
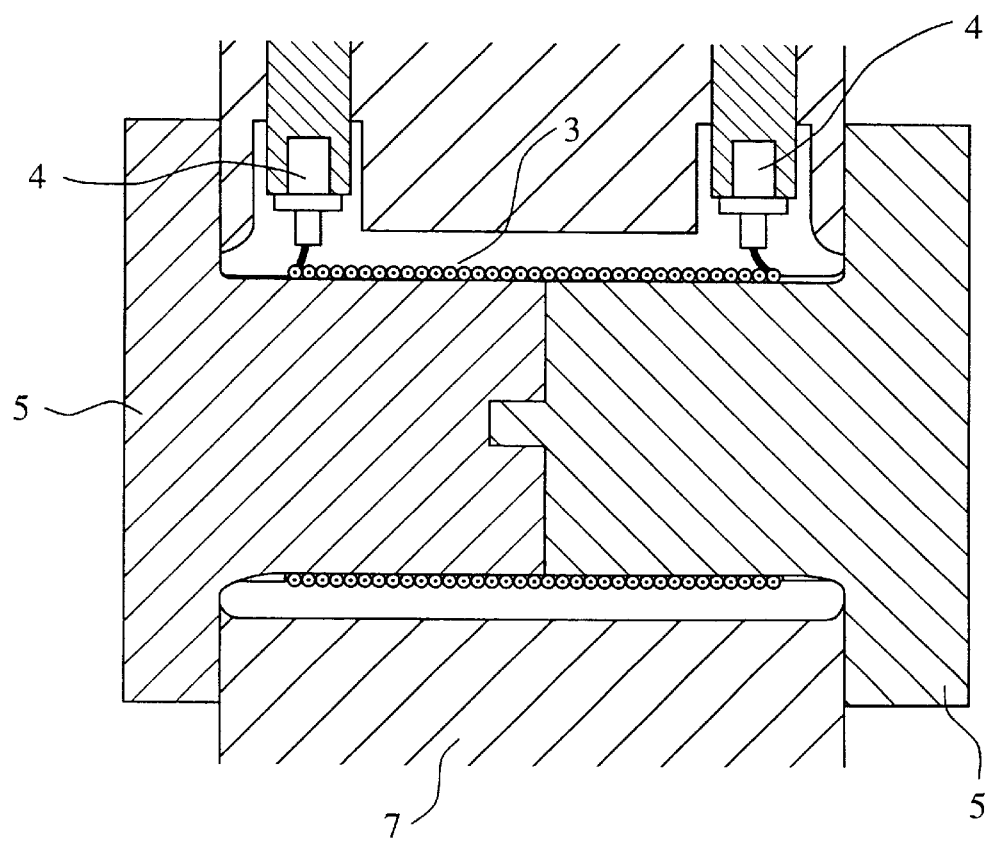
FIG. 16 is a cross sectional view showing a known method of producing an electrically weldable pipe joint.

Basically in the same manner as above except for using a core wounded by a resin-coated wire 3 having a coating thickness of about 1 mm without using no movable member 17, a pipe joint having the same number of wire turns as above was produced as shown in FIG. 16. In the inner surface of the pipe joint thus produced, there found no exposed portion of the wire. Also, the spaces between the adjacent turns of the wire were found to be uneven.

WELDING STRENGTH TEST

Figure 14:
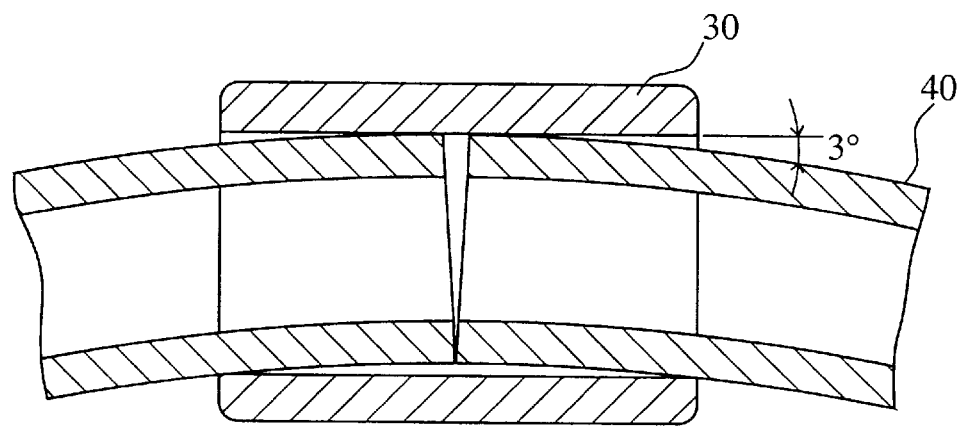
FIG. 14 is a schematic cross-sectional view showing the pipes to be connected inserted into a pipe joint employed in the weld strength test.

As shown in FIG. 14, into each of the socket-type pipe joints produced above, inserted were polyethylene pipes 40 having an outer diameter of 216 mm. The welding operation was carried out by supplying the heating current for 520 seconds, 580 seconds and 700 seconds (welding time) while forcedly bending the pipes downward at 3° against the inner surface of the pipe joint 30 at an ambient temperature of −5° C.

Figure 15:
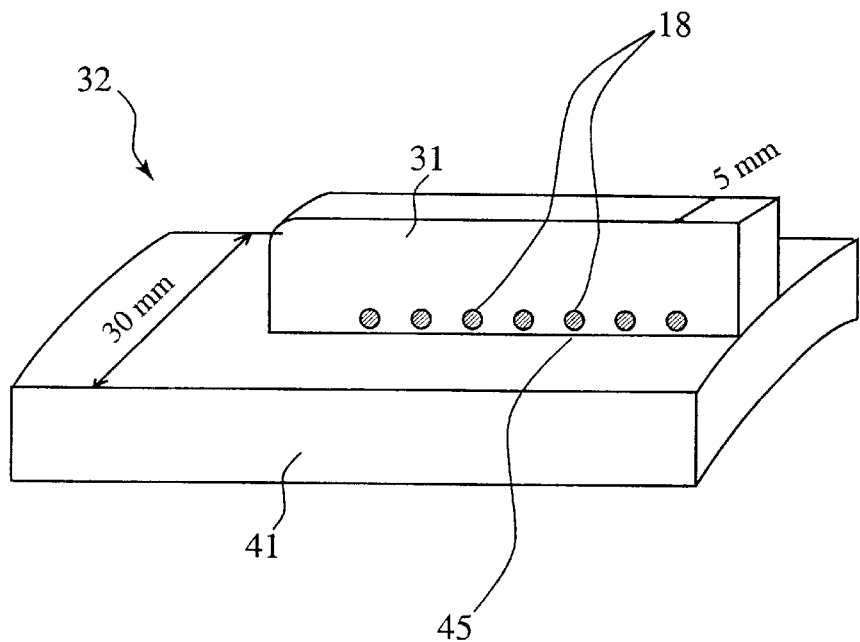
FIG. 15 is a schematic perspective view showing the test piece used in the weld strength test.

After cooling the welded product to ordinary temperature, the test pieces 32 as shown in FIG. 15 were cut out from the welded product along the circumferential direction thereof. By using a tensile machine, the portion 41 of the pipe was pulled by a plier at a pulling rate of 20 mm/min while fixing the portion 31 of the pipe joint body in a vise at an ambient temperature of 23° C. to forcedly debond the portion 41 form the portion 31.

When the welding strength was sufficiently high, the debonding occurred at the portions of the wire 18 while leaving the wire 18 on the portion 41. When the welding strength was insufficient or poor, the portion 31 together with the wire 18 was debonded from the portion 41 at the weld portion 45 between the portion 31 and the portion 41. Therefore, the welding strength was evaluated by the length (debonding length) of the portion debonded at the weld portion 45 while calculating the debonding ratio (%) by dividing the debonding length by the axial length (40 mm as shown in FIG. 8) of the wire coil. The results are shown in Table 1

TABLE 1

| Welding Time (second) | Examples | | | Comparative Examples | | |
| --- | --- | --- | --- | --- | --- | --- |
| | No. | Debonding length (mm) | Debonding Ratio (%) | No. | Debonding length (mm) | Debonding Ratio (%) |
| 520 | 1 | 2.5 | 6 | 1 | 10 | 25 |
| | 2 | 2.0 | 5 | 2 | 8 | 20 |
| | 3 | 1 | 2.5 | 3 | 7 | 18 |
| | 4 | 2.0 | 5 | 4 | 11 | 28 |
| 580 | 5 | 0 | 0 | 5 | 10 | 25 |
| | 6 | 0 | 0 | 6 | 6 | 15 |
| | 7 | 0 | 0 | 7 | 4 | 10 |
| | 8 | 0 | 0 | 8 | 5.5 | 14 |
| 700 | 9 | 0 | 0 | 9 | 4 | 10 |
| | 10 | 0 | 0 | 10 | 4 | 10 |
| | 11 | 0 | 0 | 11 | 3 | 8 |
| | 12 | 0 | 0 | 12 | 4 | 10 |

As seen from the results, the electrically weldable pipe joint of the present invention showed a debonding ratio of zero at a welding time of 580 seconds, namely the weld portion 45 had a strength higher than that of the immediate vicinity of the wire 18.

Also, the electrically weldable pipe joint of the present invention showed a high welding strength even at a shorter welding time of 520 seconds as evidenced by a low debonding ratio of 6% or less. Such a welding strength attained at a welding time of 520 seconds was higher than those obtained at a welding time of 700 seconds in the comparative pipe joints. Thus, the electrically weldable pipe joint of the present invention was confirmed to connect the pipes with a high welding strength even at a short welding time as compared with the conventional pipe joint.

As described above, in the present invention, the wire wound on the core is prevented from changing its position during the injection molding without using an inner body. Therefore the problem of interturn short-circuit during the welding operation is effectively avoided. Further, since the space between the adjacent turns of the wire is constant and the wire is partly exposed to the hollow interior of the pipe joint, the welding zone of the pipe joint and the pipe being connected is heated uniformly and immediately to produce a sound weld. In addition, since a bare wire is usable in the present invention, the production method of the pipe joint is simplified and the production cost is reduced.

What is claimed is:

1. An inner-less electrially weldable pie joint comprising a hollow cylindrical pipe joint body of a thermoplastic material and a resistance heating wire surrounded by said pipe joint body, wherein said wire is partly exposed to a hollow interior of said pipe joint body and partly embedded in an inner surface of said pipe joint body, wherein a portion where said wire is partly exposed to said hollow interior and a portion where said wire is partly embedded in the inner surface occur alternately along a circumferential direction on the inner surface of said pipe joint body.

2. An inner-less electrically weldable pipe joint comprising a hollow cylindrical pipe joint body of a thermoplastic material and a resistance heating wire configured to be at least two axially spaced wire coils defining separate welding zones, and a section of the resistance heating wire connecting said wire coils, wherein portions of the wire coils are exposed to a hollow interior of said pipe joint body and other portions of the wire coils are partly embedded in an inner surface of said pipe joint body.

3. The inner-less electrically weldable pipe joint according to claim 1, wherein said resistance heating wire is a bare wire.

4. The inner-less electrically weldable pipe joint according to claim 1, wherein innermost surfaces of said wire exposed to said hollow interior and free edges of webs which separate turns of said wire in the axial direction of said pipe joint body are nearly equispaced in a radial direction from the axis of said pipe joint body.

5. The inner-less electrically weldable pipe joint according to claim 1, wherein said wire comprises two parts arranged in an axial direction of said pipe joint body and said two parts of said wire coil define welding zones.

6. The inner-less electrically weldable pipe joint according to claim 5, wherein a portion of said resistance heating wire connecting said two parts of said wire is completely embedded in said inner surface of said pipe joint body.

7. A method of producing an inner-less electrically weldable pipe joint having a resistance heating wire which has alternately a portion where said wire is partly exposed to a hollow interior of a pipe joint body and a portion where said wire is partly embedded in an inner surface of said pipe joint body, said method comprising:

fitting a plurality of movable members with grooved surfaces for receiving said resistance heating wire to an outer surface of a core in a circumferential direction so as to move relatively to said core in an axial direction and a radial direction;

placing said core in a mold after winding said resistance heating wire thereon alternately along bottoms of said grooves and over a free outer surface of said core;

injecting a molten thermoplastic resin into a cavity defined by an inner surface of said mold and an outer surface of said core; and withdrawing said core in the axial direction while moving said movable members in the inwardly radial direction, thereby simultaneously removing said core and said movable members from an injection-molded pipe joint.

8. The method according to claim 7, wherein said core comprises two core parts each having a plurality of slide grooves in a circumferential direction on an axial end portion which is abutted to an axial end portion of the other core part, said slide grooves receiving said movable members.

9. The method according to claim 7, wherein bottoms of said grooves on an outer surface of said movable members have nearly the same height as that of the free outer surface of said core.

10. The method according to claim 7, wherein said grooved surface of said movable member has recesses between adjacent grooves, said recesses having the same depth as that of the grooves on said grooved surface.

11. The method according to claim 7, wherein said wire comprises two coil parts arranged in an axial direction of said pipe joint body.

12. The method according to claim 11, wherein a portion of said resistance heating wire connecting said two coil parts is laid on a resin sleeve disposed on an axial central portion of said movable member.

13. A method of producing an inner-less electrically weldable pipe joint having a resistance heating wire which has alternately a portion where said wire is partly exposed to a hollow interior of a pipe joint body and a portion where said wire is partly embedded in an inner surface of said pipe joint body, said method comprising:

fitting a plurality of movable members with grooved surfaces for receiving said resistance heating wire to an outer surface of a core in a circumferential direction so as to move relatively to said core in an axial direction;

placing said core in a mold after winding said resistance heating wire thereon alternately along bottoms of said grooves and over a free outer surface of said core;

injecting a molten thermoplastic resin into a cavity defined by an inner surface of said mold and an outer surface of said core;

withdrawing said core in the axial direction while said movable members remain on the inner surface of an injection-molded pipe joint; and removing said remaining movable members from said injection-molded pipe joint.

14. The method according to claim 13, wherein said core comprises two core parts each having a plurality of slide grooves in a circumferential direction on an axial end portion which is abutted to an axial end portion of the other core part, said slide grooves receiving said movable members.

15. The method according to claim 13, wherein bottoms of said grooves on an outer surface of said movable members have nearly the same height as that of the free outer surface of said core.

16. The method according to claim 13, wherein said grooved surface of said movable member has recesses between adjacent grooves, said recesses having the same depth as that of the grooves on said grooved surface.

17. The method according to claim 13, wherein said wire comprises two parts arranged in an axial direction of said pipe joint body.

18. The method according to claim 17, wherein a portion of said resistance heating wire connecting said two coil parts is laid on a resin sleeve disposed on an axial central portion of said movable member.

19. The inner-less electrically weldable pipe joint according to claim 2, wherein said section of said resistance heating wire connecting said wire coils is completely embedded in said inner surface of said pipe joint body.

* * * * *

UNITED STATES PATENT AND TRADEMARK OFFICE
CERTIFICATE OF CORRECTION

PATENT NO. : 5,916,468
DATED : June 29, 1999
INVENTOR(S) : Saburo AKIYAMA, Yoshio KATAYAMA, and Nobuhiro NISHIKATA It is certified that error appears in the above-indentified patent and that said Letters Patent is hereby corrected as shown below:

Claim 1, column 8, line 60, change "pie" to --pipe--; and
Claim 5, column 9, line 24, delete "coil".

Signed and Sealed this

Twenty-first Day of December, 1999

Attest:

Q. TODD DICKINSON

Attesting Officer

Acting Commissioner of Patents and Trademarks